(12) United States Patent
Marcus

(10) Patent No.: US 8,145,704 B2
(45) Date of Patent: Mar. 27, 2012

(54) METHOD AND SYSTEM FOR PROVIDING MEDIA PROGRAMMING

(75) Inventor: Dwight Marcus, Ojai, CA (US)

(73) Assignee: NTech Properties, Inc., Santa Barbara, CA (US)

( * ) Notice: Subject to any disclaimer, the term of this patent is extended or adjusted under 35 U.S.C. 154(b) by 0 days.

(21) Appl. No.: 12/138,925

(22) Filed: Jun. 13, 2008

(65) Prior Publication Data

US 2009/0125582 A1 May 14, 2009

Related U.S. Application Data

(60) Provisional application No. 60/934,456, filed on Jun. 13, 2007.

(51) Int. Cl.
*G06F 15/16* (2006.01)
*G06F 17/30* (2006.01)

(52) U.S. Cl. ........ 709/203; 709/231; 709/219; 709/250; 370/230; 370/352; 370/465; 714/776; 714/752; 714/702

(58) Field of Classification Search .......... 709/202–204, 709/228, 223, 206, 224, 219, 250
See application file for complete search history.

(56) References Cited

U.S. PATENT DOCUMENTS

| | | | |
|---|---|---|---|
| 7,617,190 B2 * | 11/2009 | Wright et al. | 707/3 |
| 2006/0167860 A1 * | 7/2006 | Eliashberg et al. | 707/3 |
| 2007/0180523 A1 * | 8/2007 | Jablonski et al. | 726/22 |

* cited by examiner

*Primary Examiner* — Jude Jean Gilles
(74) *Attorney, Agent, or Firm* — Howard IP Law Group, PC

(57) ABSTRACT

A method of generating media programming includes the steps of providing by an aggregator to a client a list of feeds; receiving by the aggregator from the client a selection of one of the feeds; receiving by a publisher from the aggregator the feed selection; and providing to the client media programming based on a publisher-initiated feed responsive to the feed selection and including media elements selected and concatenated with the feed responsive to the client information.

24 Claims, 8 Drawing Sheets

METHOD AND SYSTEM FOR PROVIDING MEDIA PROGRAMMING

RELATED APPLICATIONS

This application claims benefit of and priority from U.S. Provisional Patent Application No. 60/934,456, filed Jun. 13, 2007, which application is incorporated herein by reference in its entirety.

FIELD OF THE INVENTION

The present invention relates to providing of media programming.

BACKGROUND OF THE INVENTION

Methods and systems for generation of media programming have been disclosed in my U.S. Pat. No. 6,032,156, which is hereby incorporated by reference herein in its entirety. In some embodiments, a library of media elements, which may include brief video clips, brief audio recordings, and other types of media, may be maintained. The media elements are tagged, and a database maintains the tags. Various parameters and instructions for assembly of media elements into programming may be provided, such as through templates, and the media elements are assembled into media programming.

SUMMARY OF THE INVENTION

In an embodiment, a method of generating media programming is provided. A client receives from an aggregator a menu of selectable feeds. A selection of one of the selectable feeds is received at the aggregator. In response to the selection, a client is provided with media programming generated by a publisher. Information relating to the client, which may include, by way of example, user selections or user information, is furnished to the publisher. In response to receiving the user selections or user information, the publisher provides media programming, dependent at least in part on the received user selection or user information.

In an embodiment, a method of generating media programming includes the steps of providing by an aggregator to a client a list of feeds; receiving by the aggregator from the client a selection of one of the feeds; receiving by a publisher from the aggregator the feed selection; and providing to the client media programming based on a publisher-initiated feed responsive to the feed selection and including media elements selected and concatenated with the feed responsive to the client information.

In an embodiment, a system for providing media programming includes an aggregator having a memory and a processor, the processor adapted for presenting a plurality of feeds to a user, receiving a signal having data indicative of a selection of one of the feeds, and providing an output signal including data indicative of the selection and of user data; a publisher having a memory and a processor, the publisher processor adapted to receive the output signal from the aggregator, and, responsive to the data indicative of the selection and of user data, access from the memory at least one algorithm for selection and sequencing of media elements, assembling the media elements, and providing a feed to the user.

In an embodiment, a method for aggregating media programming includes presenting to a user a list of feeds; receiving an input signal indicative of a selection of one of the feeds from the list; providing an output signal indicative of the selection; receiving, responsive to the output signal, at least a first feed; and based on the first feed and user information, providing a modified feed to the user.

DETAILED DESCRIPTION OF EMBODIMENTS

It is to be understood that the figures and descriptions of the present invention have been simplified to illustrate elements that are relevant for a clear understanding of the present invention, while eliminating, for the purpose of clarity, many other elements found in typical computer systems, television networks, and methods for generating and downloading content. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein.

Figure 1:
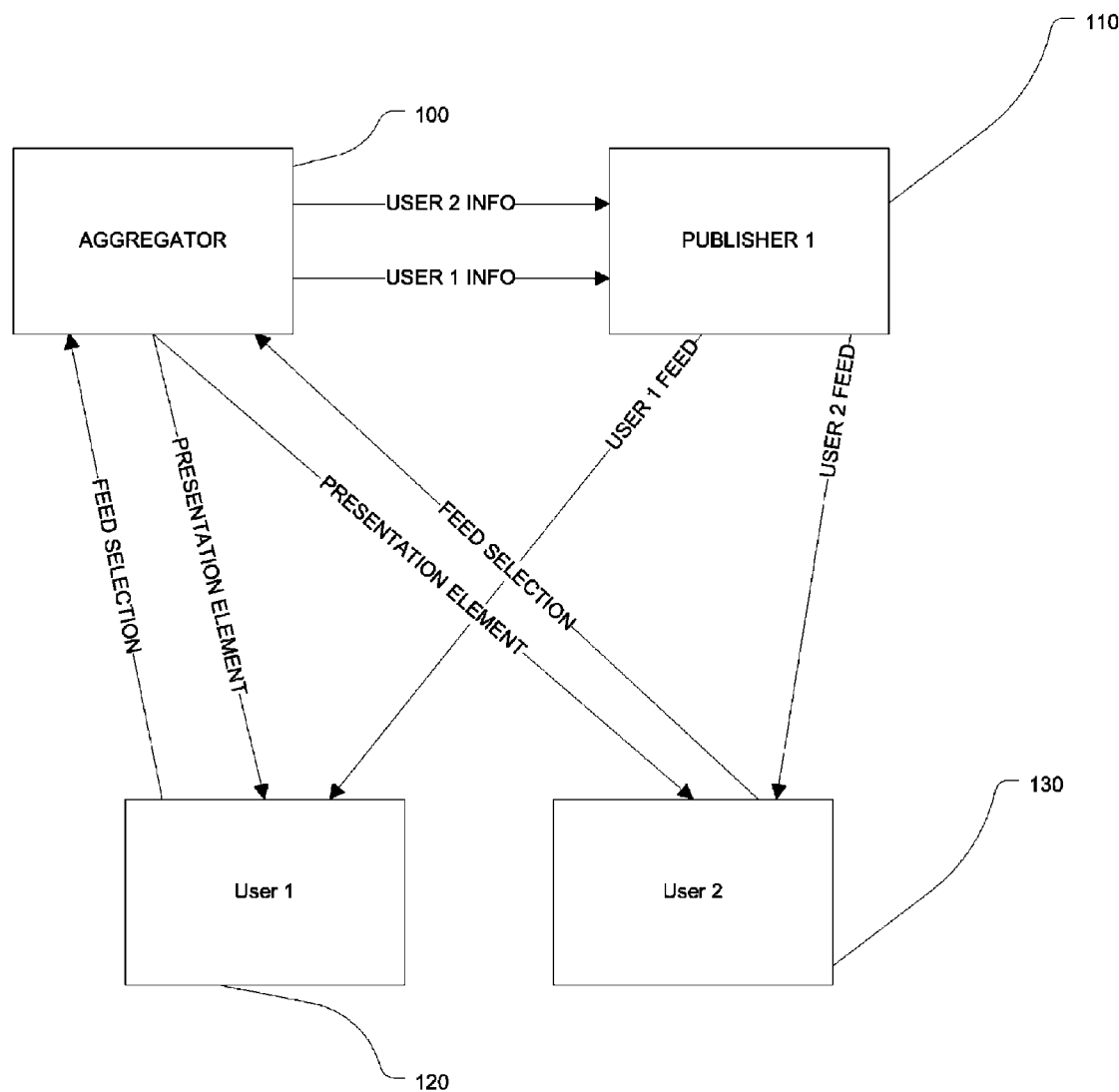
FIG. 1 is a schematic representation illustrating an embodiment of the invention.

In an implementation shown in FIG. 1, an aggregator 100 is shown. The term "aggregator" is described below. An aggregator provides a presentation element to user 1 120 and user 2 130. User 1 120 and user 2 130 may be users having client devices, which may include laptop or desktop computer systems, PDAs, cellular telephones, set-top boxes (which term includes boards incorporated in display devices and having the functionality of set-top boxes). A presentation element provides a selection of one or more feeds to the user. User 1 120 and user 2 130 each provide a selection of a feed to aggregator 100. Aggregator 100 provides information relating to each user to publisher 110. Based on the selected feed and the user information, publisher 110 provides individual feeds to user 1 120 and user 2 130, which feeds are responsive at least in part to the user information, in addition to feed selection. The feeds may include media elements selected and concatenated by the publisher responsive to at least both feed selection and user information. In an embodiment, the same feed selection by User 1 120 and user 2 130 results in the providing of different feeds by publisher 110 to the different users. The feeds may include a concatenated sequence of media elements, in which the order and selection of media elements is determined by algorithms implemented in software operating at the publisher; the algorithms may include as variables the user information. In an embodiment, the user information excludes user rights or subscription information. The content of a media feed may include a video feed, an audio only feed, a sequence of still images, and a combination of one or more of audio, video and still images.

One or more sources of programming, referred to as aggregators, which may be, by way of non-limiting example, web servers providing websites to client devices on a network, such as the Internet, a channel, an electronic program guide, or software incorporated locally on a user's system, including standalone applications or add-ons, provide a presentation element. The presentation element may include selections of sources of media programming, such as by a menu or selectable icons. The aggregator may store only a portion of available content, which may be termed media assets, locally on the memory associated with the aggregator server. The aggregator server may be a web server that hosts a website that experiences high traffic volume. The user or viewer is redirected (such as by code provided to a browser to redirect the user to a different URL, or by providing instructions and addresses for a user to furnish to the browser) to a source of the media assets. The source may be, for example, a server having a different network address, a channel from which data is received remotely, a cache stored on a client device or long-term storage device. These locations, as noted, may be client-based, for example through the use of embedded software in browsers and other client-resident software or firmware that creates a locus of media aggregation at the client's device. Microsoft Windows XP Media Center Edition is an example of client-resident software that has the capability of aggregating media elements at the client's device. It may be appreciated that a local aggregating device may aggregate locally-resident elements, elements received from a remote source, or combinations of local and remote elements.

Figure 2:
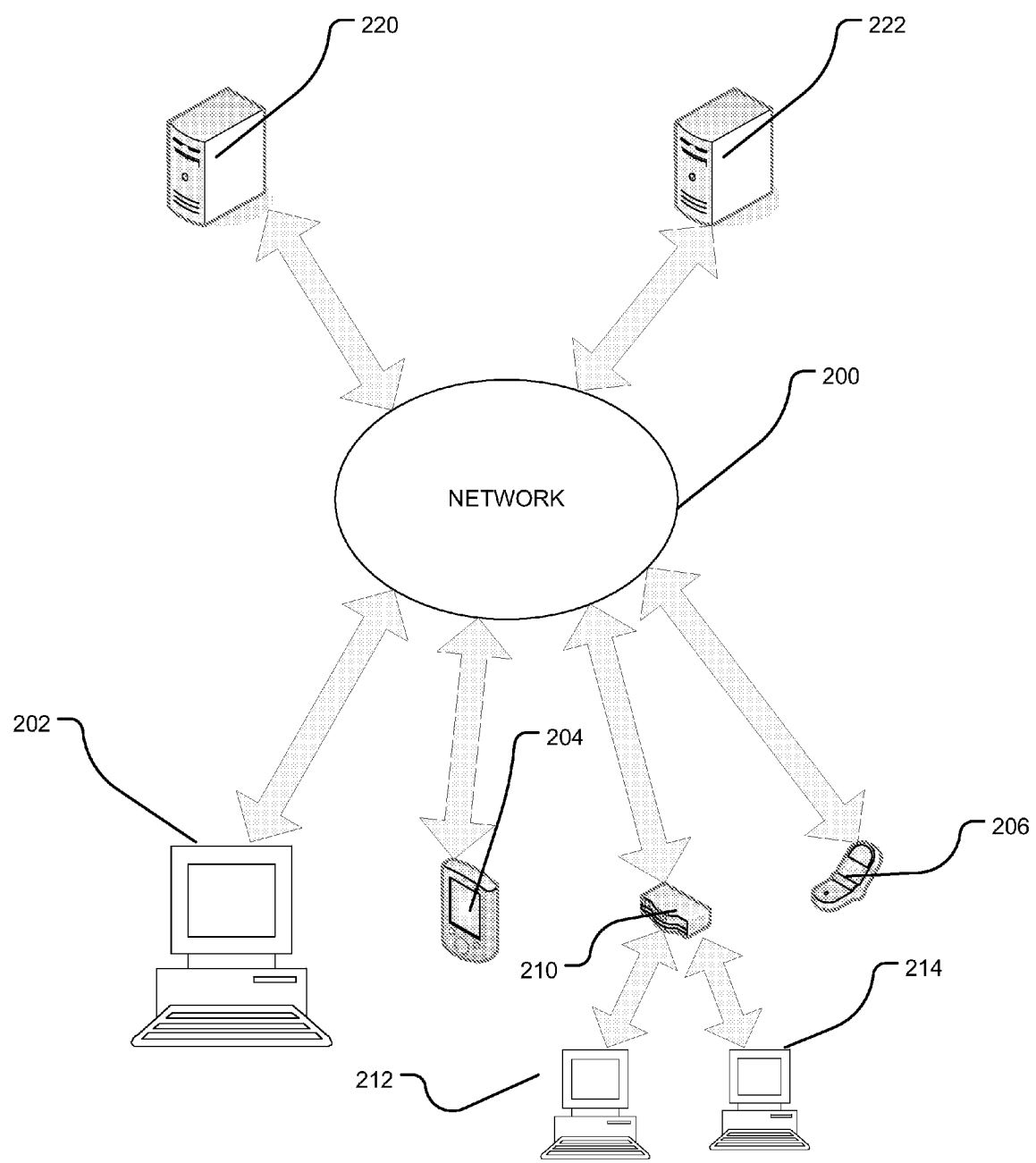
FIG. 2 is a schematic representation illustrating an exemplary system in which an embodiment of the invention having an aggregator at a web server may be implemented.

Referring, for example, to FIG. 2, an exemplary system in which an embodiment of the invention may be implemented is illustrated. In FIG. 2, network 200, which may be the Internet, a WAN, a LAN, or other network, has client devices 202, 204, 206 in communication therewith. Client devices may include a computer system 202, a personal digital assistant 204, and a cell phone 206. Router 210 is also in communication with network 200, and computer systems 212, 214 are in communication with network 200 via router 210. Each client device 202, 204, 206, 212, 214 includes a processor, memory, display, user inputs and communications interface. Each processor may be adapted to execute client software to display pages served by suitable web servers, for example. The system may also include servers 220, 222, which may be, for example, web servers. In an exemplary embodiment, server 220 may be a web server, the processor of which is executing aggregator software to provide a listing of available feeds to one or more of client devices 202, 204, 205, 212, 214. The listing of available feeds may be stored in a local memory of server 220, or in another location accessible via network 200 to the processor of server 220. In response to entry of a command on a user input, such as a keyboard, mouse click, pen, or other command on one of the client devices, a signal is sent via network 200 to server 220 including data indicative of a selection of a feed and user information. In an embodiment, user information may be stored in memory at either the client device or the server 220. Web server 222 may be a publisher, which may assemble media programming responsive to feed selection and user information transmitted via network 200.

Figure 3:
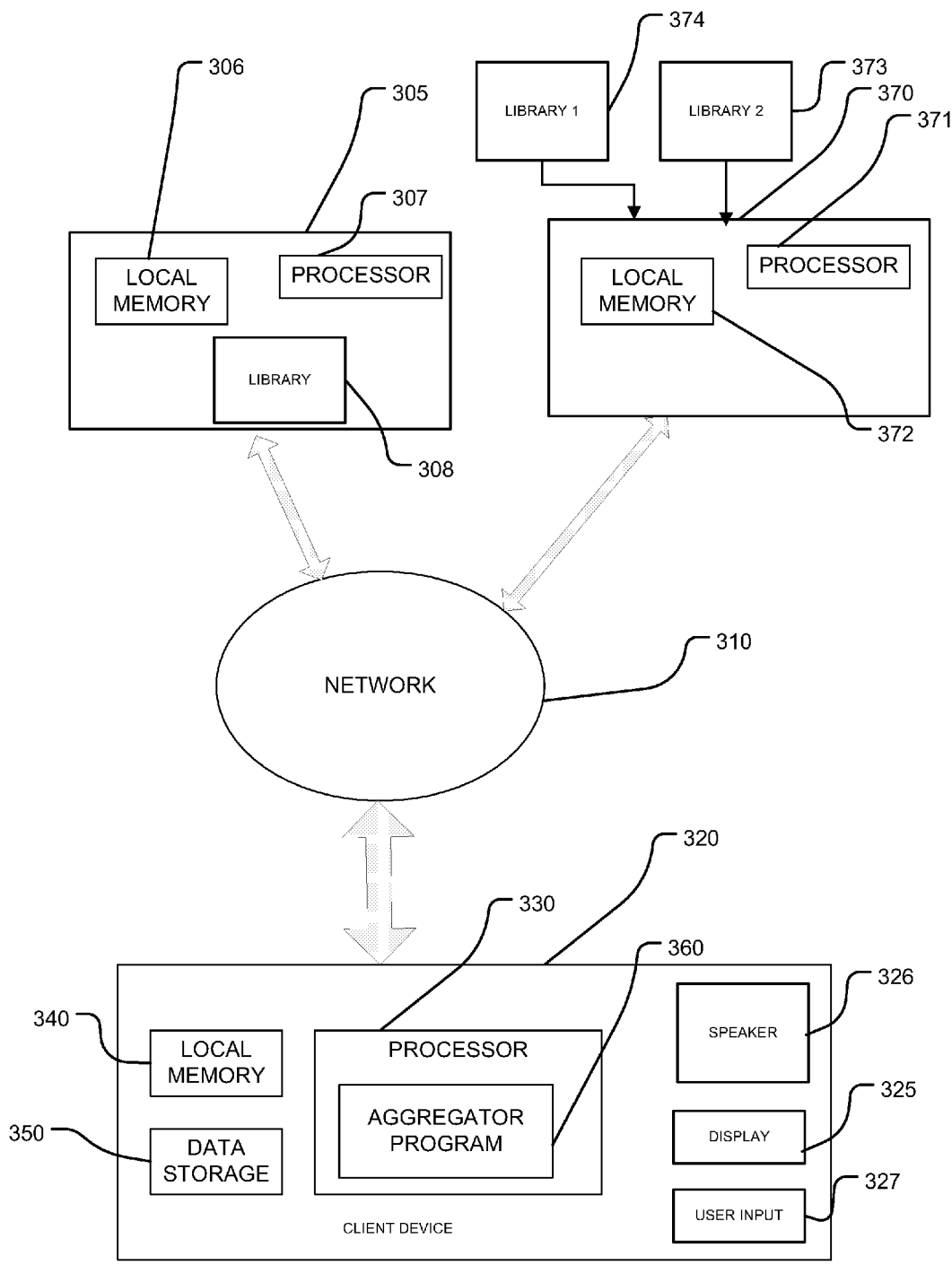
FIG. 3 is a schematic representation illustrating a system in which a method and system in which software local to a client device performs an aggregation function may be implemented.

Referring now to FIG. 3, a diagram of a system in which an aggregator is provided in the form of a program stored in memory at a client device and having instructions which, when executed by a processor at the client device, cause the processor to perform the functions of an aggregator processor. Network 310 has in communication therewith exemplary client device 320. Network 310 may be the Internet, for example. Client device 320 may be any of the client devices illustrated in FIG. 2, for example. Client device 320 has a processor 330, local memory 340, and data storage 350, such as a hard drive. Aggregator program 360 is stored in local memory 340 or data storage 350 and executed by processor 330. Aggregator program 360 includes instructions which, when executed by processor 330, cause the aggregator function described herein to be performed by client device 320. For example, aggregator program 360 causes display 325 to display a list of feeds, and receives a feed selection provided via user input 327. User input 327 may be a wired or wireless mouse or other pointing device, keyboard, touch screen, or other user input.

Publisher servers 305, 370 are in communication with client device 320 via network 310, and may be web servers, by way of example. Server 305 has processor 307, local memory 306, and local library 308 of media elements. Local library 308 may be a large, high speed data storage device including audio, video, still and other media elements stored in digital memory locations. Local memory 306 may include algorithms and templates for assembly of media elements in library 308 into programming. Processor 307 may access one or more programs having instructions, which, when executed by processor 307, cause processor 307 to receive a selection and client information provided by aggregator program 360. Processor 307 may then assemble elements from library 308 in accordance with algorithms, templates and other instructions included in local memory 306 to create a feed dependent on the received feed selection and client information. Media elements in library 308 may be tagged, and an associated database containing tags and/or other identifying information may be included in local memory 306. A media feed may be provided to client device 320 and provided to the user via display 325 and speakers 326, for example.

Publisher 370 is an example of a publisher that generates a feed based on two or more libraries at another location. Publisher server 370, which may be a web server, includes processor 371 and local memory 372. Publisher server 370 is in communication with exemplary additional libraries, library 1 374 and library 2 373. Libraries 373, 374 may be associated servers including high speed data storage devices having audio, video, still and other media elements stored in digital memory locations. In an embodiment, a publisher may have a wide variety of feeds available, and may have individual libraries dedicated to storing media elements for different feeds. By way of example, libraries 373, 374 may have media elements relating to different genres of music. Local memory 372 may include algorithms and templates for assembly of media elements in libraries 373, 374 into programming. Processor 371 may access one or more programs having instructions, which, when executed by processor 371, cause processor 371 to receive a selection and client information provided by aggregator program 360. Processor 371 may then assemble elements from one or both of libraries 373, 374 in accordance with algorithms, templates and other instructions included in local memory 372 to create a feed dependent on the received feed selection and client information. Media elements in the libraries 373, 374 may be tagged, and an associated database containing tags and/or other identifying information may be included in local memory 372. A media feed may be provided to client device 320 and provided to the user via display 325 and speakers 326, for example.

Figure 4:
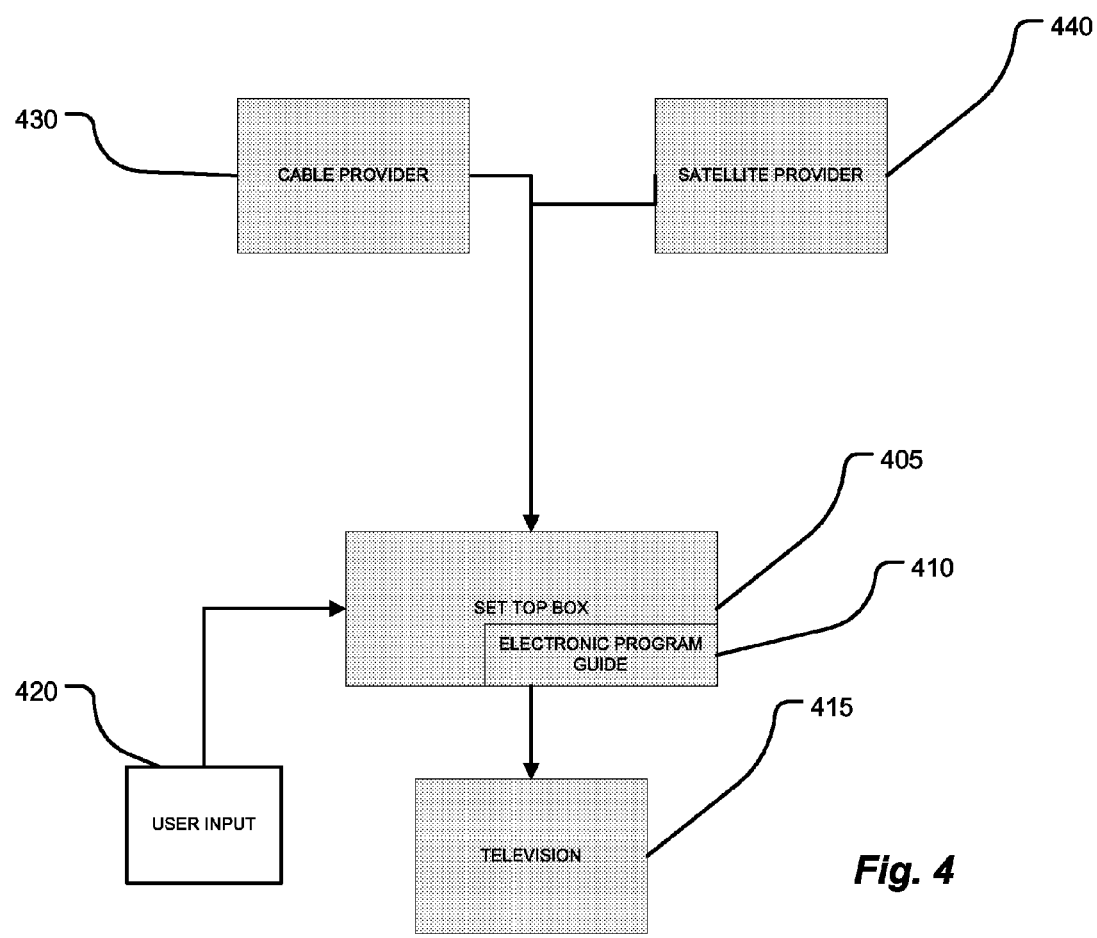
FIG. 4 is a simplified schematic representation of a television-based system in which a method and system according to the invention may be implemented.

Referring now to FIG. 4, a television-based system in which a method and system according to the invention may be implemented is illustrated. Set-top box 405 has a processor which is running electronic program guide (EPG) 410. Set top box 405 may be a physical box, or a board or other device physically incorporated into television 415. EPG 410 serves the function of an aggregator. EPG 410 may cause a list of feeds to be displayed on television 415, and the user may be able to navigate and select the list of feeds employing user input 420, such as a handheld remote control. The set top box then provides the selection and user information to exemplary programming providers, such as cable provider 430 or satellite provider 440. Cable provider 430 and satellite provider 440 each have processors and software suitable for generating feeds based on existing channels and/or additional stored media elements; the selected feed is then provided as a customized channel to the user. It will also be appreciated that the feed generation function may be located in set top box 405. For example, suitable software may be provided running on the set top box to assemble In an embodiment, one or more media feeds may be provided to a location or site, or originate from such location, that are suitable for the purposes of discovery and showcasing the contents of a remote channel, a remote site, a remote server or database. It may be desirable to maintain an economy of feeds; for example, bandwidth may be limited. For example, in the context of FIG. 3, each publisher server 305, 370 may provide a feed of limited bandwidth that is received by client device 320 and displayed. The provided feed might be a relatively short sequence that can be stored locally, may be of relatively low resolution, or otherwise adapted to conserve bandwidth. The aggregator program 360 may still provide information specific to individual users, or viewers. Such information might be stored user profiles, records of queries, and/or usage patterns such as viewing requests, skip requests, channel-changing activities and/or click actions. That information is operated on by stored media generation software executed by processor 307 or processor 371 to provide a subsequently customized feed optimized for such user/viewer. This is done in such a way that each individual viewer or similar viewer group receives media programming optimized for them—yet without occupying more aggregation location/site 'real estate' than is needed for a general media feed. As noted above, U.S. Pat. No. 6,032,156 provides exemplary methods of generating a media stream, such as a video stream, adapted for a specific user/viewer into a unicast concatenated media stream.

Figure 5:
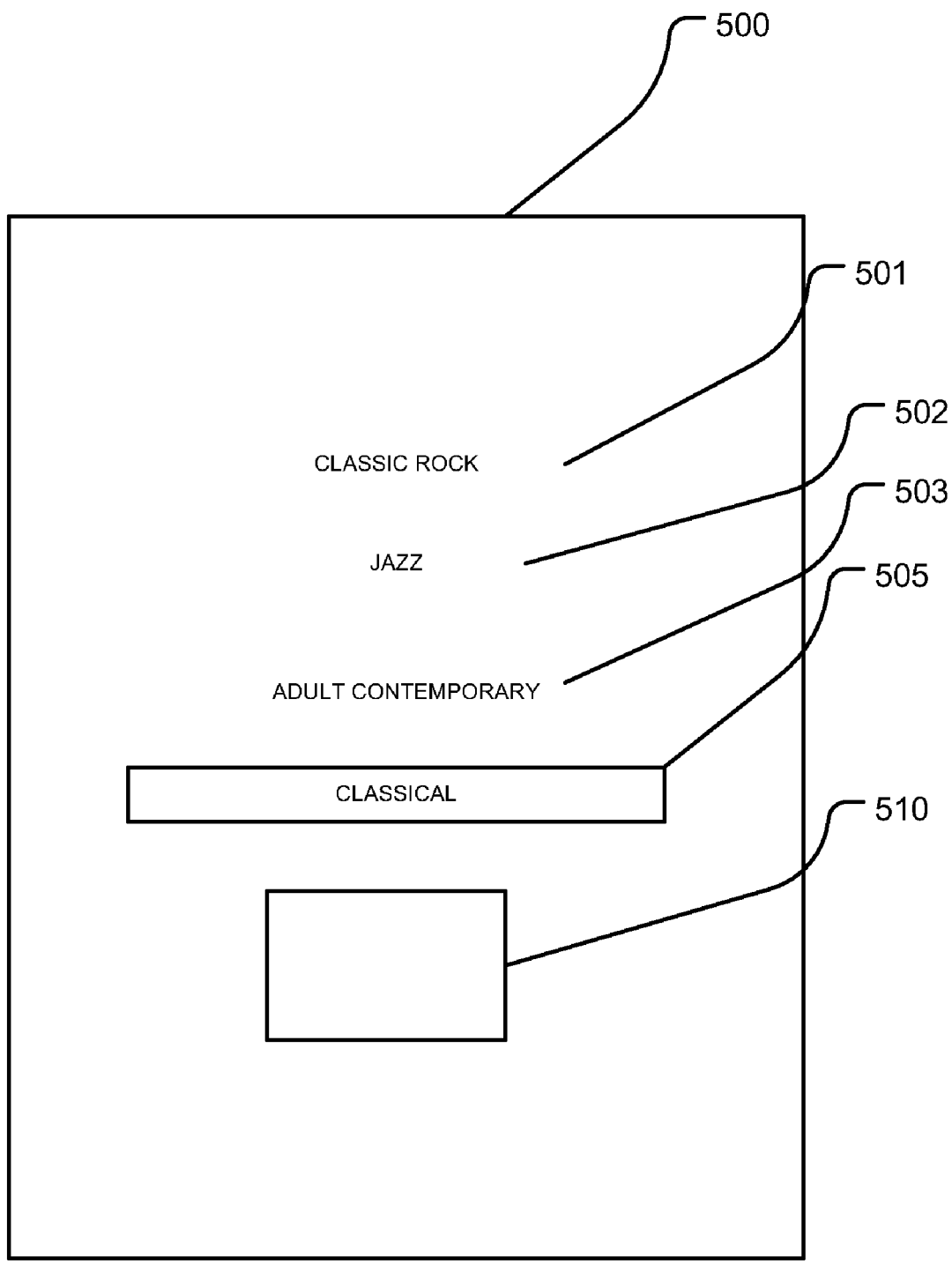
FIG. 5 shows an exemplary display featuring a presentation element generated by an aggregator.

As noted above, an aggregating source is provided. The source may be, by way of example, a web server, such as server 220 shown in FIG. 2, available via the Internet or other network, a channel, an electronic program guide (such as EPG 410 of FIG. 4), or software (such as program 360 of FIG. 3) incorporated locally on a user's system, including standalone applications or add-ons. An entity, such as without limitation a media company or media destination brand, may operate, sponsor, support or otherwise be involved with such a web server, channel, electronic program guide, and/or desktop or other local application. Such a web server, channel, electronic program guide, or local application may be referred to as an "aggregator". An aggregator provides numerous sources of media content on a front page or other user-accessible presentation element. For example, referring to FIG. 5, an exemplary display 500 showing a presentation element generated by an aggregator is shown. In this example, music feeds 501, 502, 503, 505 are available. Feed 505 has been highlighted, and the user may select feed 505, such as by clicking on a mouse or on an enter button on a television remote control, or may scroll up to highlight a different feed. In an implementation, the highlighted feed may be presented on the display, such as in window 510.

Such sources of media content are suitable for the presentation, and/or consumption, of viewing/listening/interaction opportunities. The sources may be entirely or partly provided by sources remote from the aggregator. Such other sources may be maintained by entities other than the entity that sponsors or supports the aggregator. By way of example, some or all of the media sources thus presented are drawn from remote sources by a suitable method or device, such as, without limitation XML feeds, RSS feeds, Atom feeds, Podcasts, simple video/audio feeds or streams or syndication technologies. These methods may be referred to herein as "feeds." An XML feed is an example of a feed. The sources of feeds will are termed "publishers."

In the examples noted, an aggregator permits a user to cause a signal to be provided to an aggregator processor requesting a selected feed through an action such as a mouse click on a web page displaying a menu of feeds, or by providing a channel selection signal to a television displaying an electronic program guide. In an embodiment, an aggregator may include a printed or static reference to a feed. Once the user follows the information provided in the printed or static reference to select the feed, user information or selections may be furnished to the publisher, and the method and system may be implemented as described herein. By way of example, the static reference may be a web address or a channel.

Figure 6:
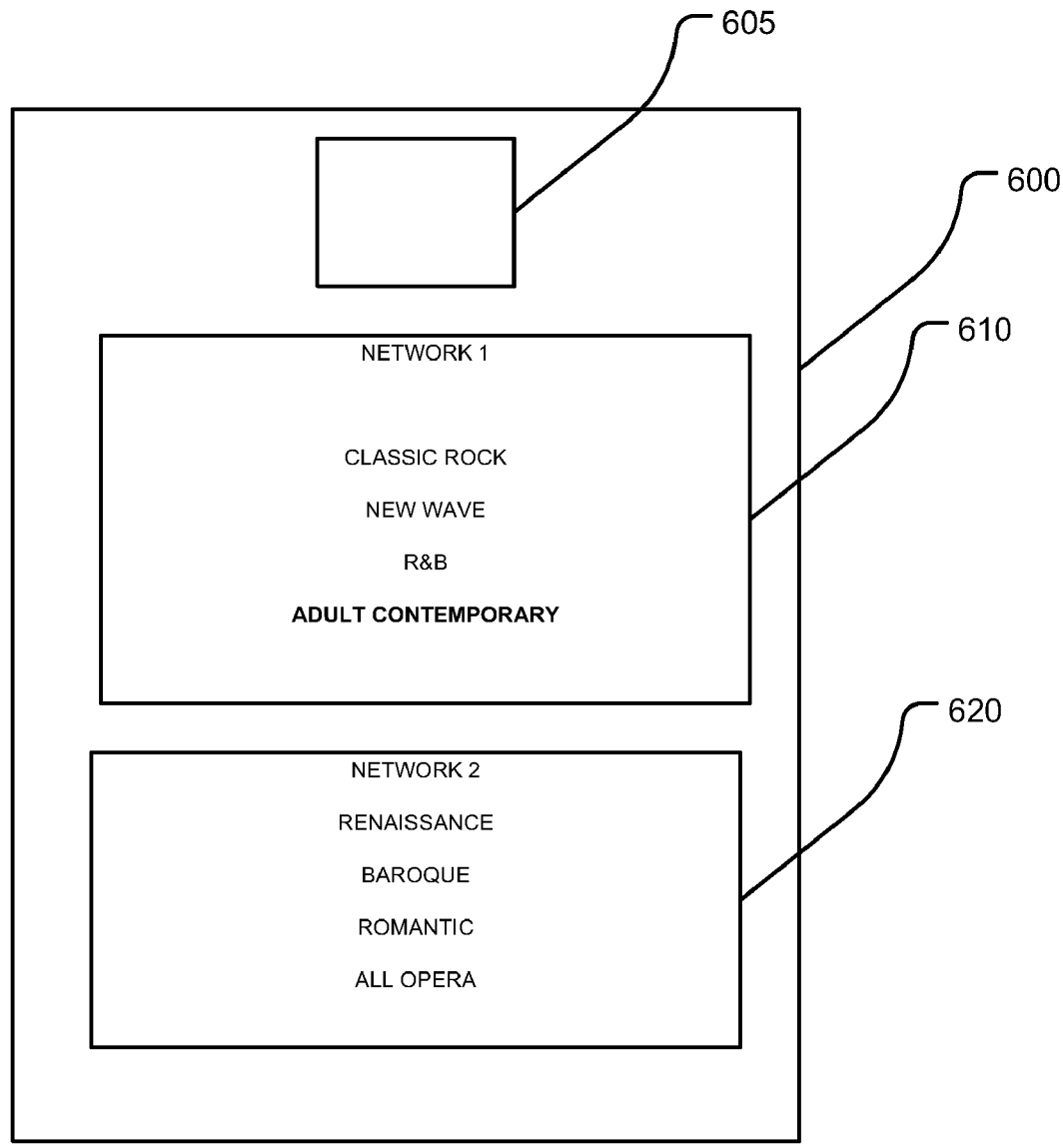
FIG. 6 shows an alternative exemplary display featuring a presentation element generated by an aggregator having feeds from two publishers.

A presentation element of an aggregator may include, for a given publisher, one or more placements or positions on the presentation element. In some circumstances, there may be competition among publishers for positions on the presentation element. The presentation element may be a menu page, for example, or a graphical layout presenting multiple positions from one or more publishers. The presentation element may be dynamic; for example, the presentation element may scroll through different selections, or may present a sequence of different pages with different menus of feeds. Different entities that control publishers may be desirous of obtaining the visibility coming from inclusion in the presentation element, as well as obtaining a relatively prominent position within the presentation element. In some instances, there may be competition among entities controlling publishers for prominence (including position, size of display, visual prominence of display, effects associated with a display, and otherwise) on a presentation element of an aggregator. An aggregator may provide a limited number of feeds, in order to make the presentation element more desirable. For example, referring to FIG. 6, a presentation element 600, which may be a web page, is shown. The publisher identified as Network 1 has a list of feeds on the first area 610 of the presentation element. The publisher identified as Network 2 has a list of feeds on a second area 620 of the presentation element 600. The user has scrolled or moved a mouse so as to highlight in first area 610 the feed identified as "adult contemporary." In an embodiment, the highlighted feed is presented in box 605.

A possible consideration in the selection and prominence of feeds may be desirability of such feeds for the likely customers of the site, or the possible revenue obtained from an arrangement with the publisher. In some cases, an entity that has a variety of media offerings may, for any number of reasons, have a number of feeds at a presentation element that is less than the number of media offerings which it wishes to make available through the presentation element. In some exemplary cases, an entity that has a variety of media offerings may desire to make more than one type of media offering available through a single placement on a presentation element. A method and system disclosed herein provides, by way of example, a way of providing more than one type of media offering through a single placement. For example, the entity controlling a publisher may be provided with the ability to provide multiple media offerings, such as by using a method or system for creating media programming from a library of media elements, such as in my prior patent incorporated by reference above. Alternatively, communication from a user may permit a user to select between one or more streams, feeds or channels of media programming. A method or system in accordance with an embodiment advantageously may permit a single placement to provide to the user multiple streams or selections of media programming.

In an embodiment, in response to the selection, the publisher may provide a first feed having content from at least second and third feeds, and, in response to a further user selection, provides content preferentially from one of the second and third feeds. An entity providing continuous programming in the form of several channels (at least second and third feeds), each showing music videos in a particular style, may have a single placement at a presentation element of an aggregator. The entity providing the programming may control a publisher. The publisher may include a server running software capable of selecting media elements, different media streams, or other types of content, in response to received user selection or information. An aggregator, as noted above, might be a website generated by a server, or an electronic program guide. The single placement may represent a single feed, such as a single XML video feed (i.e., a first feed). The single XML video feed might provide, in response to an initial selection from a user, programming including a representative mix of music video styles—Folk, Country, Rock, Pop etc.—which might represent all available styles, or may be in an order or frequency selected to be of likely interest to viewers/users of the aggregator, based, for example, on demographic information about such viewers or users. As media elements representative of different feeds are presented, an icon or other element may be presented on a display; upon mouse clicking or other selection action, a signal is transmitted to the publisher indicative of selection of a particular one of the feeds, and in response only elements from that feed are provided.

The user selection may be made by clicking on a mouse when a cursor is positioned on an aggregator page over an icon or thumbnail representing the feed. The aggregator receives the user selection of the feed. The aggregator may provide the feed, or the user may be handed off to the publisher to provide the feed to the user.

In one embodiment, in response to the received selection of a feed, the publisher provides a predetermined feed during a first time period, and provides a feed responsive to the received client information in a second time period. Thus, the same initial feed may be provided to all users who make a particular selection. In another embodiment, the publisher may receive information pertaining to the user and provide some level of customization of the feed. By way of example, the publisher may have two or more predetermined streams of media available, and may select one of those streams based on the received user data. In another embodiment, the publisher may have a library of media elements, and may assemble media programming made up of those media elements based on the received information pertaining to the user. The received information may include browsing history pertaining to the user; for example, if the user has browsed pages on the aggregator's site prior to selecting a feed, the pages, or information relating to the content of those pages, may be provided to the publisher. A cookie identifying the user and known to the publisher, if available, may be provided to the publisher. Initially, the feed may provide a video playing, or recently played, on the feed which is assumed to provide a content center of interest to the visitor. The content center may be a particular element that was being displayed at the time that the user selected the feed. The user information may include an identification of the element being displayed at the time of selection. Tags associated with that element may be employed by a processor, such as processor 307 of FIG. 3, to generate a customized feed. For example, in the example of FIG. 5, the classical program playing in window 510 when the classical feed 505 is highlighted and selected may have been a video of a 1985 performance of Ricardo Muti conducting the Philadelphia Orchestra playing a Brahms symphony. The resulting information may include interest in 1980's performances, performances by Muti, performances by the Philadelphia Orchestra, performances of Brahms works, performances of other late Romantic composers, merely by way of example.

A processor may receive a signal including data indicative of the content element, such as a video, still photo, song or other audio element, that generated, or in probability generated, a mouse-click or similar user-driven event. It will be appreciated that the element that generated the user decision may have concluded in a window prior to the mouse click; the received information may not necessarily include synchronization between the timing of a mouse click and the time of display of the element. In response to the selection, the aggregator may transfer the source of programming to a publisher, such as publisher server 222 of FIG. 2, or the feed is communicated via the aggregator program. In an embodiment, the selection by the user of a feed on a presentation element may activate a customized feed, or may cause delivery of an existing feed, while a publisher processor processes the user information to start customizing the existing feed; the customization process may be considered an intelligent learning process, as more information is collected to refine the user's interests.

User actions may have been collected by, for example, logging in or creation of user profiles, swapping of cookies for the purpose of determining action history, or simple action collection, such as mouse motions, click patterns or channel selection. If user actions or profiles have been polled or collected in any manner, then in the event that multiple feeds are available each containing different forms of content (whether taken as a whole as final streams, or unitarily, as in individually cached video clips or stream segments)—or from locally-cached media content of various types—then this information is passed to, for example, a client-side media assembly engine or switching system or handed off to the remote feed's source, which would typically be configured with the media assembly engine described above. Media elements may be categorized in a wide variety of different manners, such as either aesthetically/subjectively, e.g., feature films of slightly different subjective character, or objectively, such as exercise or cooking content. It will be appreciated that a media assembly engine may be provided at a client's device, at the aggregator's server, or at the publisher's server, for example.

User information that may be passed to the publisher may include, by way of example, viewing history, user preference data, search queries or patterns. By way of example, the aggregator or publisher may have pre-existing data relating to the user. For example, a search engine provider may have information pertaining to searches previously carried out by the user, and may make such information available for use by the publisher, or by another party in connection with determination of the content of a stream. In the context of FIG. 4, cable provider 430 or satellite provider 440 may have stored information regarding past viewing records of the user, which may be accessed by a processor and employed in generation of a feed.

In some embodiments, a publisher or other provider of a feed may have a predetermined feed which is provided initially, or is provided to a user in the absence of any user information. The predetermined feed may be determined based on factors not related to user information, such as time or date. An algorithm for providing a wholly or partly customized stream may provide for modification of one or more elements of the predetermined feed if certain conditions relating to user information are met. The initial feed or stream may be modified based on user information provided at the outset of the feed.

Two exemplary methods for generating a feed are the following.

First, a media assembly engine such as the one disclosed in U.S. Pat. No. 6,032,156 can be implemented, either locally, such as on a client system, or remotely, such as on a web server, to modify the contents of a stream with any combination of switching (with or without caching) between media feeds such as video RSS feeds to the aggregation location. The method may be implemented using media source files from any location. The files may be, for example, client-cached, streamed from multiple servers, or both client cached and streamed from multiple servers, simultaneously within a given stream.

The location of the media files and the media assembly engine may be transparent to the user. By way of example, user information may be passed to the appropriate client-side or server-side location for incorporation into the logic of a media assembly engine without the user taking any action.

Second, the user-selected media feed may be modified at one or more locations, such as a source external to the client and the aggregation server, or at the aggregator's server, by implementing a media assembly engine, to make media selections that are in accord with the choices individual and/or statistical to the feed itself. In the example of FIG. 3, a feed may be generated by library 1 374, and may be modified by a media assembly engine at any of media assembly engine 374, server 370, or client device 320.

In connection with a media assembly engine implemented locally to the user, the user experience can be customized by altering the source of the media elements through individually self-modifying streams as described in U.S. Pat. No. 6,032,156. The user experience may also be customized by switching between feeds to the aggregation site. This customization approach may employ appropriate stream metadata to identify the 'character' of the stream's content and local caching to facilitate aesthetically-suitable switching. In an embodiment, stream metadata may by a media assembly engine by deriving keywords from the content of the stream itself. Additional keywords might be generated from a map of synonyms or related terms. By way of example, keywords derived from a 'Food Channel' might include 'cooking', 'dining', 'nutrition' and 'French cuisine' in addition to 'food', 'TBS' and 'food channel' obtained directly from the content.

Caching may be desirable as the content on multiple feed or cached sources are not typically synchronized. It may thus be desirable for a processor of a media assembly engine to employ a nominal delay on the general presentation of the entire media stream. Client-side caching of multiple streams may be provided to allow optimal points to be made available for inter-stream switching or concatenation. In an embodiment, feed sources may be switched without regard to aesthetic effect. Image recognition algorithms and speech recognition algorithms may be employed to identify disjunction in scene, narrator or talent changes; when such disjunction is identified, algorithms that provide suitable transition effects may be accessed and applied to the feed. As the content on multiple feed or cached sources are not typically synchronized it may be desirable to employ a nominal delay on the general presentation of the entire media stream, or to use client-side caching of multiple streams to allow optimal points to be made available for inter-stream switching or concatenation. In an embodiment, feed sources may be switched without regard to aesthetic effect.

In one implementation, any given feed to the aggregator is dynamically switchable (see U.S. Pat. No. 6,032,156 for one method) at its source. Based on user information, such as a record of browsing or a user profile furnished to the source, and suitable algorithms, the stream may be customized to a unicast or narrowcast stream. The stream may be renamed, either at the source site or elsewhere. Information associating the user and the renamed stream may be provided by the source to the aggregator, so that the aggregator may properly associate the renamed stream with the appropriate user or users. The aggregator may use such methods as user profiles, cookies, or proxy IDs. The new stream is returned to the aggregator. In this implementation, typically a page or pages may be customized for the user or viewer and suitably identified. In a web-based system, the page may be assigned a unique URL. The pages may be for display on any suitable device, including a computer, PDA, cell phone, or television receiving signals from a set-top box.

In an embodiment, multiple streams, which may be customizable or predetermined, are provided to an aggregator; based on user information, such as user actions or user profile, the streams are modified, if they are customizable. If the streams are not customizable, a concatenation of portions of the multiple streams is provided. This concatenation may be implemented by assembling or switching between those multiple streams at the client side, such as by using a switching system or a media assembly engine. This concatenation may also be implemented by passing information corresponding to the user's use, or anticipated usage pattern, of the multiple streams from a client to the aggregation server or source; a media assembly engine at the aggregation server or source may concatenate based on this information and one or more algorithms. Concatenated or customized feeds are then passed back to the aggregation site, which may be a page or pages (whether, for example, on a user's computer, PDA, cell phone, or set-top box) customized for that user/viewer.

In one implementation, media elements or streams, or libraries of elements and streams, may be cached at the aggregator. A non-limiting example of an offline aggregator is a media player, such as a compact portable digital media player, including for example a player for digital music files, such as those sold by Apple Inc. under the iPod® brand, with access only to files in its memory. In some implementations, a mix of both client-based caching and online or remote sources for media files may be employed. For example, in the system of FIG. 3, aggregator program 360 may create a customized media stream or feed based on one or more feeds received from publishers 305, 370, and media elements stored in data storage 350. It will be appreciated that in any implementation assembly of either local or remote media assets, or both, can be accomplished on a client computer system or device through the use of an assembly engine or switcher. Assembly may also be implemented by passing media files, or identifying information or proxies for the media files, to a remote server or group of servers (such as the aggregation server(s)). The media files may be assembled at the remote server or group of servers into a new stream. Such a new stream defines a new composite experience. This composite experience may include viewing, listening, playing, and/or a combination of all of those. The new stream might be an entirely separate stream, or may be combined with one, several, or all streams arriving at the aggregation site to provide customized streams. In this case a page or pages (whether, for example, on a user's computer, PDA, cell phone, or television displaying signals from a set-top box) may be generated by the aggregator, which page has been customized for that user/viewer. This new 'home page' or other presentation form might be customized to reflect the desires and/or needs of the particular user/viewer. It will be appreciated that customization of a home page may include customization resulting in home pages each presented only to one user/viewer, or to customization such that the same home page is presented to more than one viewer or user. Differing home pages may be generated and provided to different viewers.

An Example Using a Dynamic RSS-Feed Methodology

In an example of multiple streams provided to an aggregator and then modified or concatenated, a remote channel presents various music videos in a mix of styles. There may be one or more feeds to the aggregator, but within the limits described above, each feed contains predetermined content, not customized for a viewer or user.

A user viewing an aggregator home page 'clicks' on the remote video feed presenting the music videos. More precisely, a user generally clicks on the representation of content, or of a unit of content to initiate, or foreground, the stream within the feed. In this example, the channel arrives by an XML feed called 'Music TV Channel X'. 'X' here represents the initial state of the undifferentiated, or predetermined without use of viewer or user information, music feed.

Upon clicking on 'Music TV Channel X' the user is presented the stream of the music channel. In this example, user information, such as the user's profile or query or viewing history is returned to the remote server of the Music TV Channel. Here, with or without the initial state metadata described above, the user receives the undifferentiated or predetermined feed.

Now the user begins to interact with the stream. The stream may include options and controls for the viewer. The signals from the viewer may be received and processed at the aggregator, or may be passed to the originating feed server. As each interaction occurs, appropriate metadata representing these actions (individually or collectively smoothed or conditioned) is passed to the originating server or a remote server. The metadata may provide answers to questions such as the following: Did the user select a musical genre from a menu? Did the user click on a short-form excerpt of a video and view all or substantially all of the long-form of the video? Such short form excerpts are described, for example, in my U.S. patent application Ser. No. 11/649,727, filed Jan. 4, 2007, which application, along with the applications incorporated by reference therein, is incorporated by reference herein. Did the user skip a short form video or cancel out swiftly from a long-form video, thus indicating perhaps unsuitability? Did the user search for a particular artist or song name? It will be appreciated that other information may be obtained.

All of this usage information may be passed back to the originating server or a remote server and stored by the server processor in a local memory at the server. The processor of the server may commence customizing or optimizing the stream. The originating server now dynamically assigns a new feed ID, or name, which may, for example, be an appended ID to the feed's name—in this case 'Music TV Channel X', where 'X' might now be, for example, a (probably new) unique character/numeric string associating the new feed with the user by any mean. 'X' however, may represent any method of identifying the feed with an identifier unique to a user, user group, or any suitable representation of such a user or group. The feed URL might remain the same, but the elements contained within the resultant feed the next time it is retrieved/refreshed by the same user or user proxy are in some way modified in response to the viewer query/interaction.

If the engine is at the publisher, the information is passed from the aggregator, e.g., by a cookie.

In the generation of the feed, various user information may be considered. User information may include the media displayed prior to the click, the click pattern of the user on the aggregator site, or on other feeds or sites. User information may include information stored by a search engine provider, including topics of interest relative to past searching.

Appropriate parameters may be set at the aggregating server to allow the featured channel with the default 'X' value to be replaced dynamically by the channel with the new 'X' value. Such replacement might be implemented on a new dedicated page or in the original position of the feed on the page. Thus the single original feed featured on the aggregating site or location is replaced by multiple unicast or narrowcast feeds each associated with a user or group of like users. Each such feed may include a dynamically-varying sequence of media elements; the selection and order of the elements may be unique for each user. Templates may be stored at the media generation engine which control the generation of the sequences. A feed may include media elements selected based on user information including, by way of example, current viewer behavior only, or a longer record of viewer interests, or a combination of both, to provide a sequence of media elements suitable to that viewer's instantaneous and/or long-term desires.

Targeted Advertising Implementations

One or more feeds may include elements that are tagged or labeled to indicate the generation of revenue or royalty. In general terms, such labels indicate that an advertiser has an obligation to provide payment or other value if a revenue-generating element is employed; such labels also may indicate that a payment or other value is due to a content provider or other owner of rights. Elements requiring other types of transactions may also be incorporated. These elements that generate royalty or revenue or other types of transactions include, without limitation, media clips, sidebars, overlays, audio elements, animation elements, and/or graphical elements residing/displaying within or outside of a player region. Such elements may include sponsorship elements, advertising, pay-per-view media and the like. Such elements may be inserted by an engine in any feed or stream described herein. The methods described herein allow such elements to be inserted dynamically, which allows user-responsive or user-sensitive variants in positioning, frequency, type, demographic targeting, geo-targeting and psychographic targeting to be effectively applied to the feeds on a user by user basis. Users might be grouped initially by a first parameter or set of parameters only. For example, users may be grouped, by geo-targeting parameters, based on estimated geographic location, upon an initial visit to the aggregator. As additional user and usage data is collected, users may be grouped with greater refinement. Positioning of elements may include dynamic temporal and spatial positioning within the content of a stream. Dynamic temporal or spatial positioning of elements on an aggregation location or site in accordance with user information may also be provided. It should be mentioned that revenue/royalty-generating media elements need not be treated differently, except in respect to their revenue generating aspects, than other media elements. Revenue/royalty-generating elements may be inserted in one or more feeds and/or streams dynamically in the same way as other media elements. The methods and systems disclosed herein advantageously for advertisers represent a highly optimized delivery opportunity. Because users can be targeted by profile, use patterns and contextually—even across the elapsed time of the stream—the value of these ad/promotional elements is optimized. This refined targeting results in higher cost-per-exposure (by any metric) and thus more profitability for ad purveyors (like agencies and media networks) and higher return on investment for advertisers.

Figure 7:
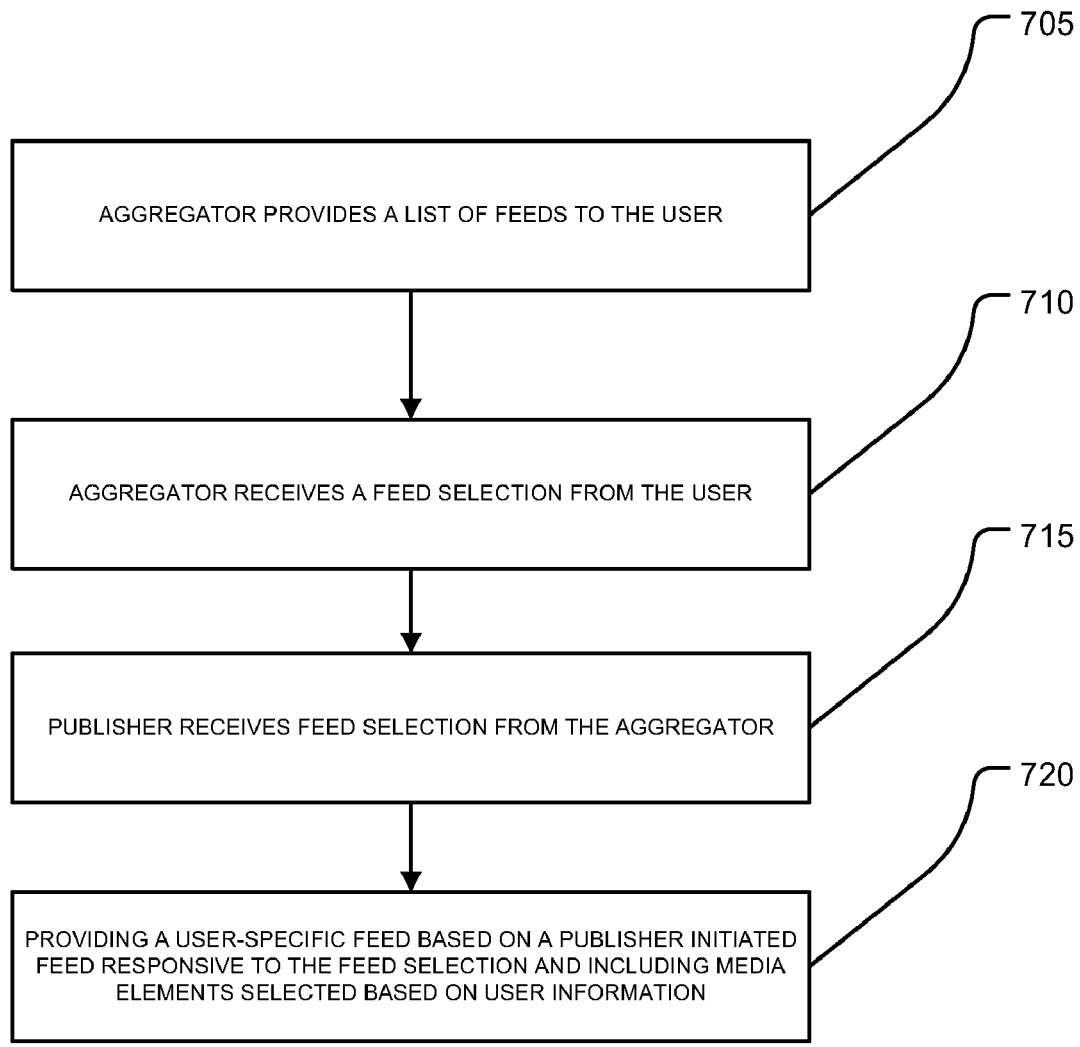
FIG. 7 is a process flow diagram illustrating steps in a method of an embodiment of the invention.

Referring now to FIG. 7, an exemplary process flow will be illustrated. In the process flow, a list of feeds is provided to the client device by an aggregator 705. The aggregator receives a client selection of one of the listed feeds 710. The aggregator provides the selection to a publisher 715. In an embodiment, the aggregator may also provide client information to the publisher, for the publisher to use in generating a user-specific stream. A feed is then provided to the user, based at least on a stream from the publisher and media elements selected based on the user information 720. In an embodiment, the publisher may generate a stream including selection of media elements based on the user information. In an alternative embodiment, the publisher may provide a predetermined stream to a client device, which selects additional media elements based on user information to create the user-specific stream.

Figure 8:
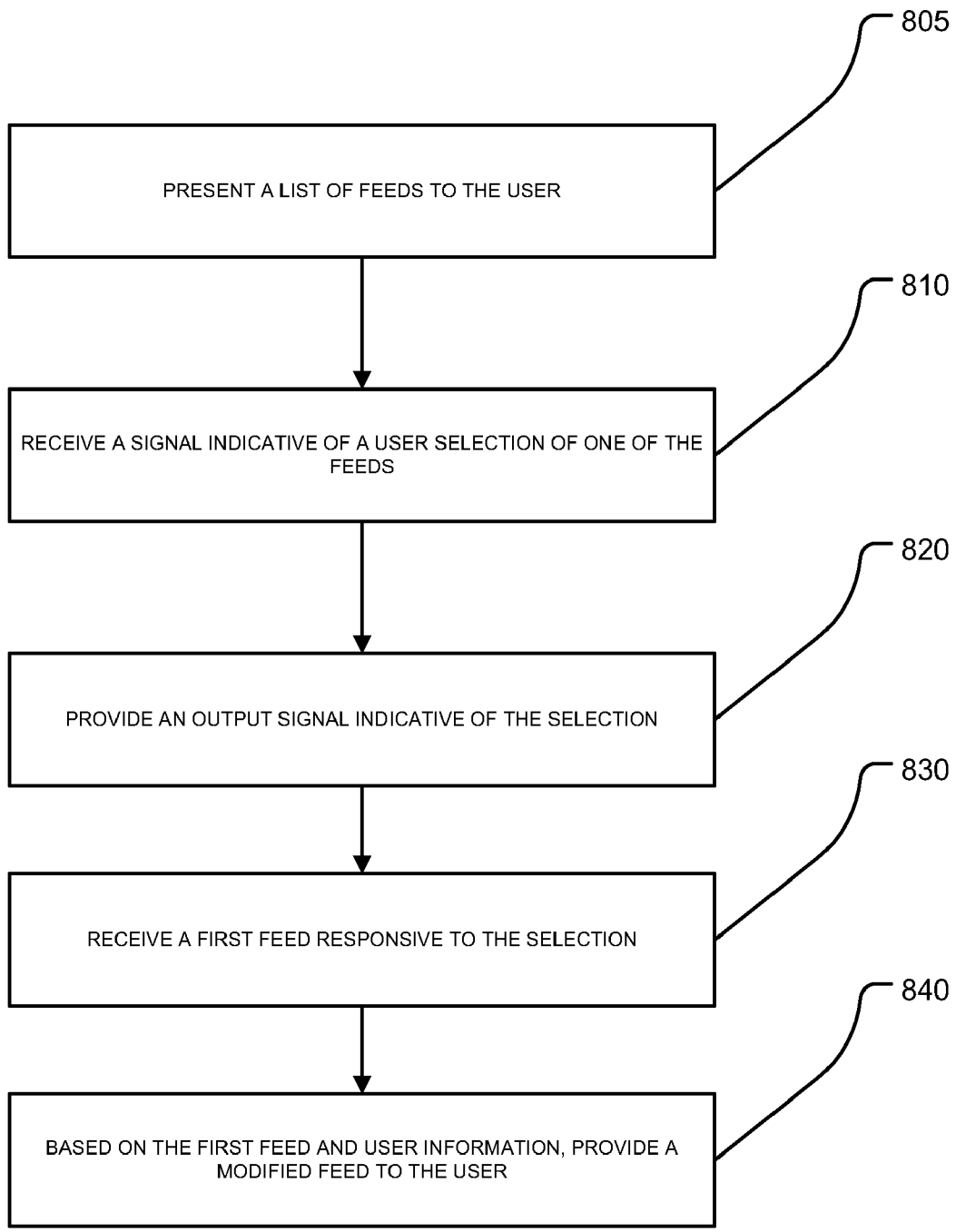
FIG. 8 is a process flow diagram illustrating steps in a method of another embodiment of the invention.

Referring now to FIG. 8, another exemplary process flow will be illustrated. This process flow is a method for aggregating media programming. In a first step, which may be performed by an aggregator, a list of feeds is presented to a user 805. An input signal is received, indicative of a selection of one of the feeds from the list 810. The signal may also be received by the aggregator. An output signal is provided indicative of the selection 820. This step may also be performed by an aggregator, and the signal may be provided to a publisher. At least a first feed is received responsive to the output signal 830. The first feed may be received from a publisher at a client device, at an aggregator, or other media assembly engine. Based on the first feed and user information, a modified feed is provided to the user 840. This step may be performed by a media assembly engine at a client device, at an aggregator, or at a component of a publisher. For example, in the context of FIG. 3, a feed may be provided from library 1 374, and a media assembly engine may run on publisher 370 to generate the modified feed.

The methods and systems described above may be implemented with computer storage products or computer readable media that contain program code or computer software for causing a processor to perform the various computer-implemented operations. The computer-readable medium is any data storage device that can store data which can thereafter be read by a computer system such as a microprocessor. The media and program code may be those specially designed and constructed for the purposes of the present invention, or they may be of the kind well known to those of ordinary skill in the computer software arts. Examples of computer-readable media include, but are not limited to magnetic media such as hard disks, floppy disks, and magnetic tape; optical media such as CD-ROM disks; magneto-optical media; and specially configured hardware devices such as application-specific integrated circuits (ASICs), programmable logic devices (PLDs), and ROM and RAM devices. Examples of program code include both machine code, as produced, for example, by a compiler, or files containing higher-level code that may be executed using an interpreter. Steps in the computer-implemented methods may be implemented in processors running software stored locally, and/or in configurations such as application service providers, in which certain steps are executed on processors communicating with one another over a network such as the Internet. Either stand-alone computers or client/server systems, or any combination thereof, may be employed.

It will be appreciated that any of the steps in the methods described above may be implemented by one or more processors executing instructions stored in computer-readable memories. It will be appreciated that any of the method steps described above may be implemented by means for performing the step, wherein the means for performing the step include a processor operating in accordance with instructions contained in computer program code.

The methods and systems described herein may employ any suitable communications interface and hardware. By way of non-limiting example, communications may be implemented in a network, such as the Internet, employing the TCP/IP protocol.

Media elements may be stored in any suitable medium, which may include magnetic media, and both digital and analog media. Media elements may be stored and transmitted in a compressed format, such as the MPEG-3 format for video, or may be stored and transmitted in uncompressed formats.

In embodiments having multiple media generators, it will be appreciated that there are numerous possible distributions of the functions of generating media. For example, all media elements may be stored in a single library in the memory associated with one device, which device generates all programming. Alternatively, an entire library of media elements, or portions of a library of media elements, may be stored in association with one or more additional media generators. Protocols may be provided for distribution of media elements between different stored libraries of media elements. A library of media elements is any set of more than one media element.

It will be appreciated that the embodiments described and illustrated herein are merely exemplary.

What is claimed is:

1. A method of generating media programming for display on a client, comprising:
    receiving by an aggregator data relating to a plurality of media streams;
    accessing by the aggregator user information;
    based on the user information and the data related to the plurality of media streams, determining by the aggregator a temporal sequence of media programming comprising the media streams;
    accessing by the aggregator over a network the plurality of media streams; and
    providing by the aggregator to the client media programming in the determined temporal sequence, the media programming comprising concatenated elements of the plurality of media streams.

2. The method of claim 1, wherein the aggregator comprises a web server.

3. The method of claim 1, wherein the aggregator comprises software stored in a client memory device and adapted to be executed on a client processor.

4. The method of claim 1, wherein the aggregator comprises an electronic program guide.

5. The method of claim 1, wherein the user information comprises past usage information of the user.

6. The method of claim 1, wherein the media programming comprises a video feed.

7. The method of claim 1, wherein the step of providing the media programming comprises providing from a web server via a network to the client the media programming.

8. The method of claim 1, wherein the step of providing the media programming comprises providing the media programming on a television channel.

9. The method of claim 1, wherein the media programming is provided through at least one of an XML feed, an RSS feed, Atom feed, and a podcast.

10. The method of claim 1, further comprising providing by the aggregator a presentation element for presenting data indicative of a plurality of media streams to the user, and, responsive to a user selection of one of the presented media streams, providing by the aggregator the selected media stream in the media programming.

11. The method of claim 10, further comprising, in response to user highlighting of one of the displayed media streams, displaying by the aggregator the highlighted media stream on a user display together with a list of media streams.

12. The method of claim 11, wherein the user information includes the identity of a media element playing on the displayed highlighted media stream prior to the receipt of the user selection.

13. The method of claim 10, further comprising, in response to the received selection, providing predetermined media programming during a first time period, and providing media programming responsive to the user information in a second time period after the first time period.

14. The method of claim 1, wherein the data related to the plurality of media streams comprises categorizing data associated with media elements of the media streams indicative of subjectively determined character of the media elements.

15. The method of claim 14, wherein the user information comprises viewing history, user preference data and search queries.

16. The method of claim 14, further comprising deriving by the aggregator keywords from the media streams, deriving by the aggregator from the derived keywords further keywords from a map of synonyms, and employing the further derived keywords in determining the temporal sequence.

17. The method of claim 1, wherein at least one of the media streams comprises media elements having labels indicative of payment due from an advertiser and payment due to a content provider.

18. The method of claim 1, further comprising caching by the aggregator the media streams prior to providing the elements in the media programming, whereby switching between streams at optimal times is facilitated.

19. A system for providing media programming, comprising:
an aggregator having a memory and a processor, the processor adapted for presenting a plurality of media streams to a user, receiving a signal having data indicative of a selection of one of the media streams, and providing an output signal including data indicative of the selection and of user data; and
a publisher having a memory and a processor, the publisher processor adapted to receive the output signal from the aggregator, and, responsive to the data indicative of the selection and of user data, access from the memory at least one algorithm for selection and sequencing of media elements, select a temporal sequence of media programming comprising the selected media stream and other media elements based on an output of the algorithm using the selection and the user data, assemble the selected media stream and the other media elements in the temporal sequence, and provide media programming to the user including the assembled media stream and other media elements in the temporal sequence.

20. The system of claim 19, wherein the aggregator comprises a web server, the aggregator processor being adapted to present a web page listing the media streams for display on a client device.

21. The system of claim 20, wherein the publisher comprises a web server, and wherein the aggregator processor is adapted to redirect a client device to the publisher web server.

22. The system of claim 19, wherein in response to the selection, the publisher provides a first media stream having content from concatenated elements of at least second and third media streams, and, in response to a further user selection, provides content preferentially from one of the second and third media streams.

23. A method for aggregating media programming, comprising:
presenting to a user a list of media streams;
receiving an input signal having data indicative of a selection of one of the media streams feeds from the list;
providing an output signal having data indicative of the selection;
receiving, responsive to the output signal, at least the selected media stream; and
responsive to the data indicative of the selection and user information, and using at least one algorithm for selection and sequencing of media elements, selecting a temporal sequence of media programming comprising the selected media stream and other media elements, and providing media programming to the user, the media programming comprising the other media elements selected and concatenated in accordance with the temporal sequence with the selected media stream.

24. The method of claim 23, further comprising receiving a second media stream, and wherein the step of providing media programming comprises switching at least between the selected media stream and the second media stream in accordance with the temporal sequence.

* * * * *